United States Patent [19]
Wood

[11] 3,858,822
[45] Jan. 7, 1975

[54] SPINNING REEL
[75] Inventor: Morris E. Wood, Bronson, Mich.
[73] Assignee: True Temper Corporation, Cleveland, Ohio
[22] Filed: Feb. 14, 1972
[21] Appl. No.: 225,917

[52] U.S. Cl. ............................................. 242/84.2 A
[51] Int. Cl. ............................................... A01k 89/00
[58] Field of Search .... 242/84.21 A, 84.2 A, 84.2 F

[56] References Cited
UNITED STATES PATENTS
| | | | |
|---|---|---|---|
| 3,059,873 | 10/1962 | Hull | 242/84.2 A |
| 3,062,474 | 11/1962 | Clark | 242/84.2 A |
| 3,284,019 | 11/1966 | Wood | 242/84.21 A |

Primary Examiner—Billy S. Taylor
Attorney, Agent, or Firm—J. H. Slough

[57] ABSTRACT

There is disclosed herein a spinning reel having a spool and line retrieving mechanism comprising a rotatable and axially slidable drum mounted in a fixed bearing, and a pivoted trip arm carried by the drum adapted to drop in front of the bearing to hold the drum in a forward position and, upon rotation of the drum, be tripped outwardly by a stepped trip on the front of the bearing whereby the drum is allowed to retract. A pivoted pickup lever is also carried by the drum and has a wheel responsive to an axially movable ejector ring whereby a portion of the lever is ejected to engage a line from the spool either when the ejector ring is moved axially toward the drum or the drum retracts toward the ejector ring.

14 Claims, 9 Drawing Figures

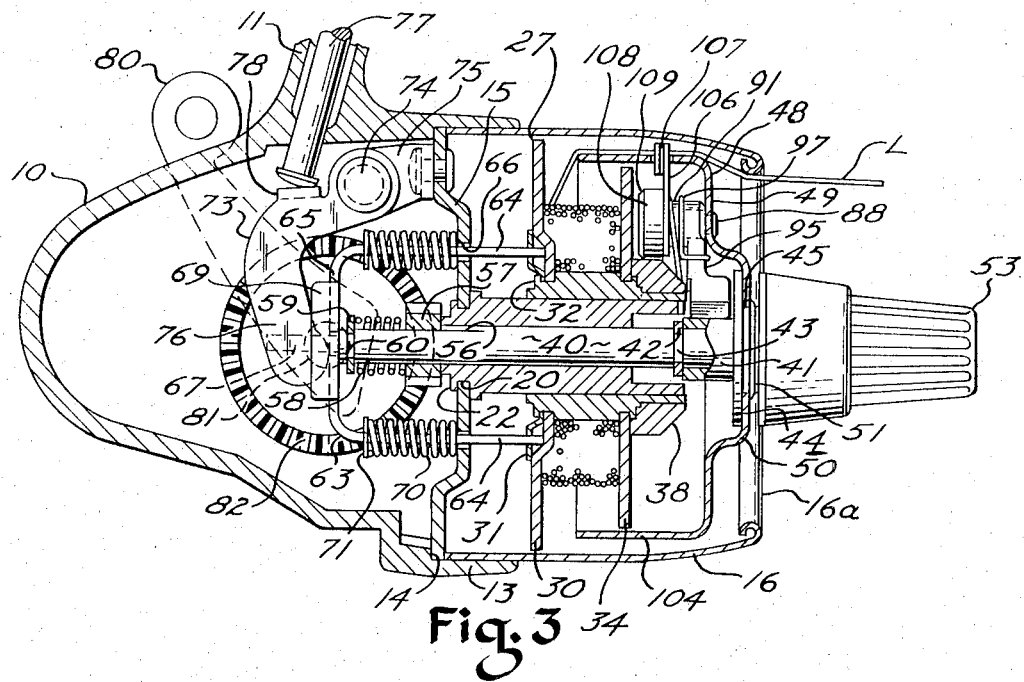
Fig. 3
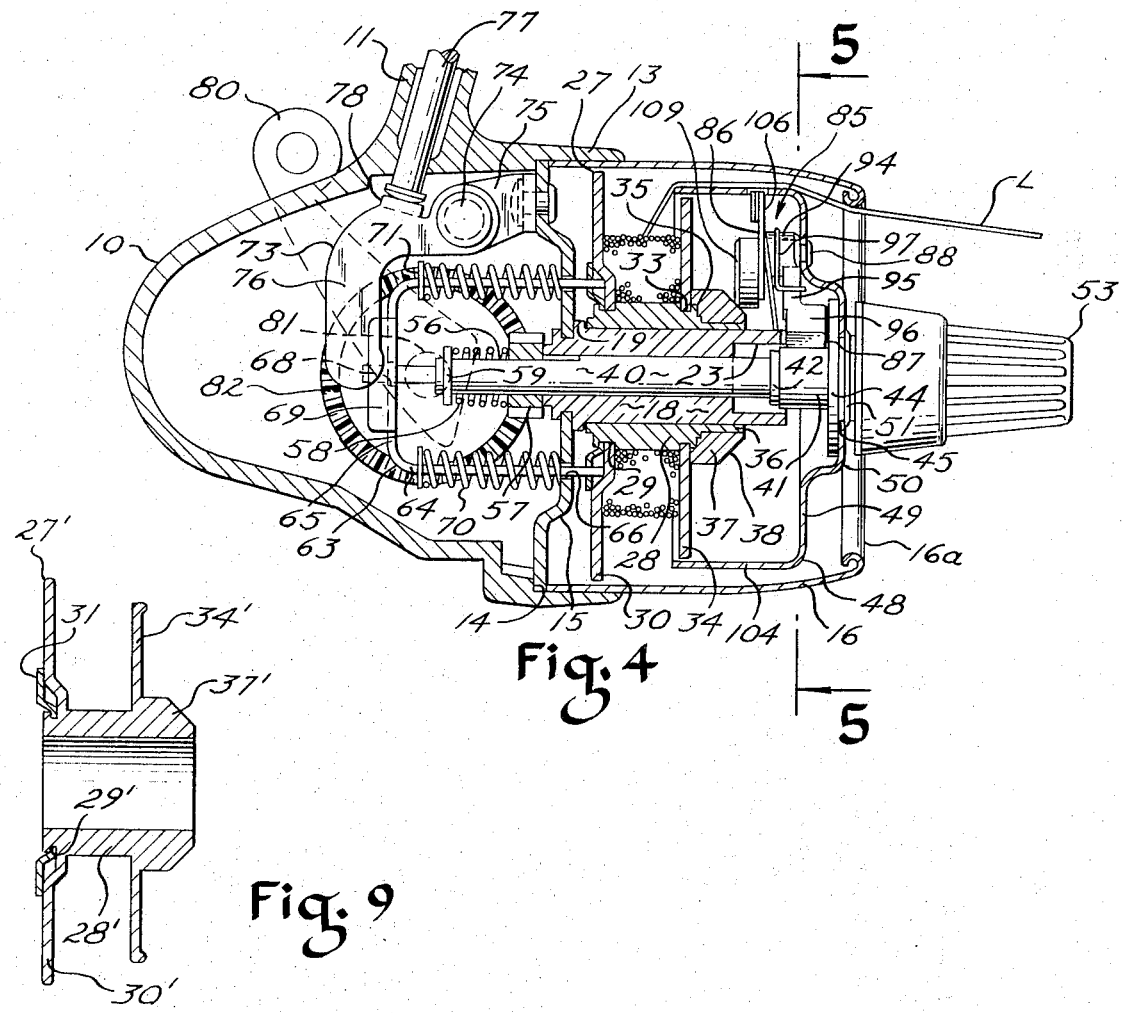
Fig. 4
Fig. 9

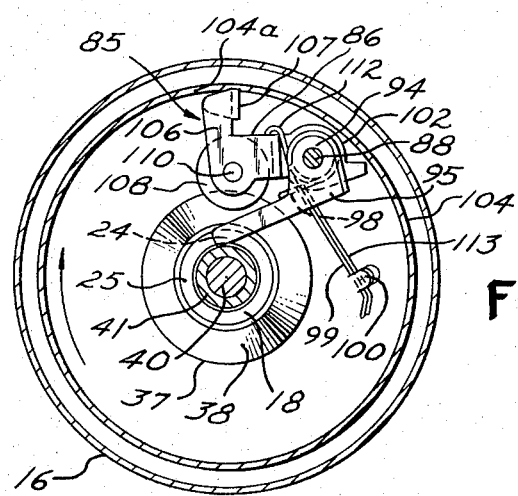
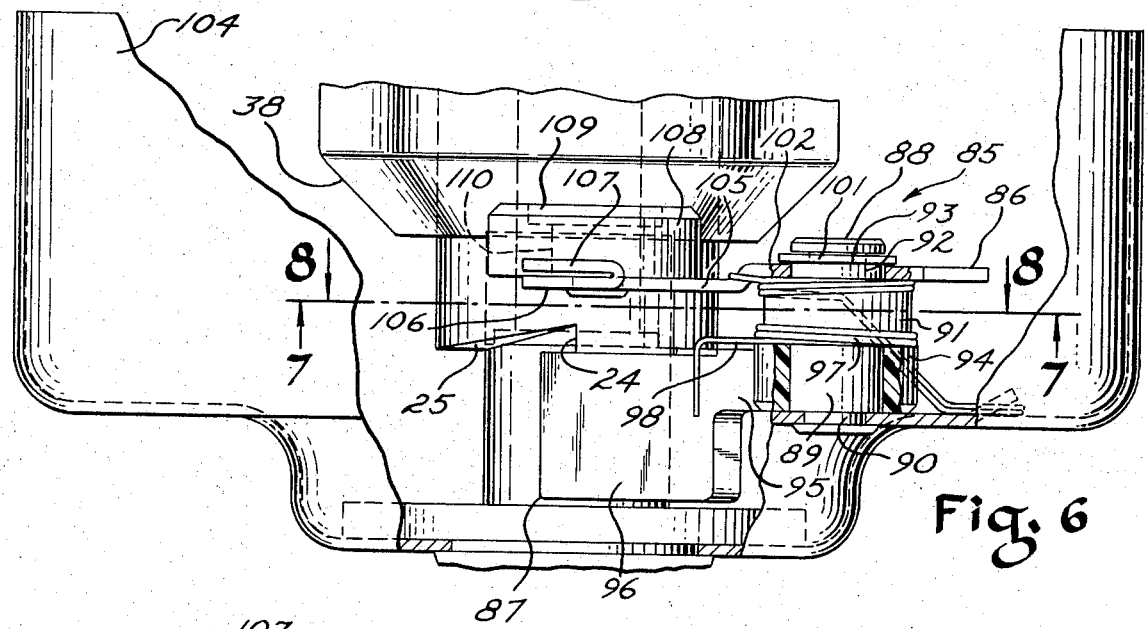
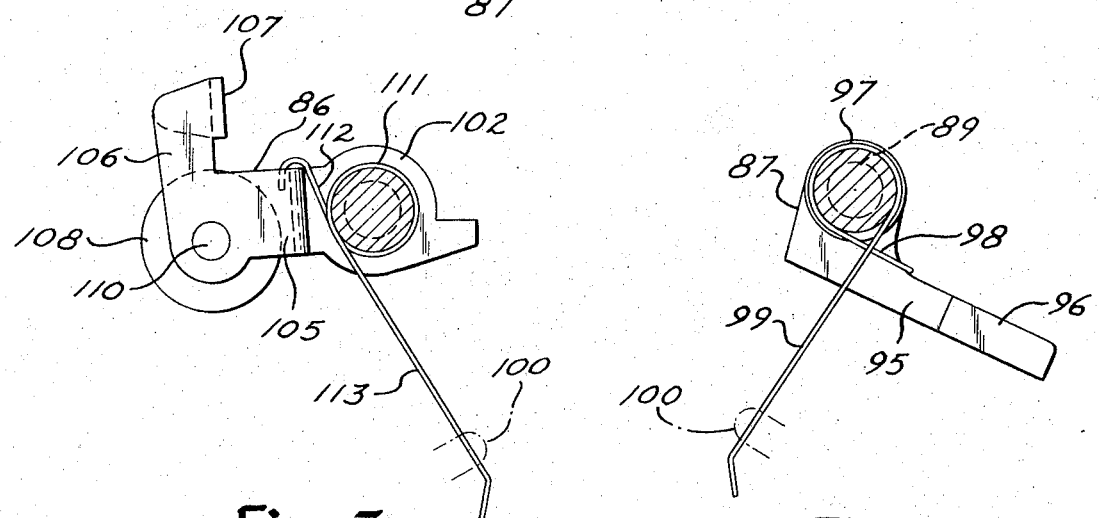
Fig. 5
Fig. 6
Fig. 7
Fig. 8

SPINNING REEL

The present invention relates to improvements in spinning reels of the type disclosed in applicant's U.S. Pat. Nos. 3,284,019, issued Nov. 8, 1966, and 3,296,731 issued Jan. 10, 1967.

The above referred to reels include a spool having the axis thereof disposed generally in the direction of cast and having a coaxial, longitudinally slidable winding drum carrying an internally pivotally mounted, outwardly projectable line control element which is spring biased inwardly, and a pivotally mounted control lever, also spring biased inwardly. Upon rotation of the drum, the control lever normally rides on the outer surface of a fixed tubular bearing which also carries a longitudinally slidable operating element or ejector ring normally disposed rearwardly of the line control element, said control lever having a portion supporting the line control element and holding it in the outwardly projected position. The drum is mounted on a shaft which is slidable in the fixed bearing, and the control lever is dropped inwardly in front of the fixed bearing when the drum is moved forwardly to retain the drum in a forward position. The operating element or ejector ring moves forwardly slightly ahead of the shaft and drum and projects under a portion of the line control element to keep it in the projected position, both operating element and shaft being moved by a thumb actuator. When the actuator is released, the operating element returns rearwardly allowing the line control element to retract and the line to move freely off of the spool.

The longitudinally slidable operating element or ejector ring has a frustoconical forward face whereby when the winding drum is retained in the forward position by the control lever and the line control element is retracted, said ejector ring can be moved forwardly to wedge the line control element outwardly for snubbing the fishing line.

Upon rotation of the winding drum to retrieve the fishing line, the control lever is tripped outwardly by a trip on the end of the fixed bearing, said control lever having means engaging the line control element whereby said element is moved outwardly and projected from the drum simultaneously with the tripping of the control lever. The winding drum is biased to then return rearwardly to normal winding position.

The above referred to prior art reels have proved to be highly dependable and positive-acting in use. The present invention is directed to further improvements therein in the area of the pickup mechanism. The embodiment of the invention herein disclosed comprises a pickup lever having a roller for engaging the frustoconical face of the ejector ring. The present pickup lever is allowed to "float" or pivot entirely free of the release lever at all times whereby tripping of the release lever outwardly does not in itself immediately eject the pickup lever to cause the line to be wound upon the spool. Thus tripping of the release lever involves overcoming the tension of the release lever spring only, resulting in smoother operation and less wear to the parts.

The means for ejecting the pickup lever whereby it projects outwardly of the winding drum comprises the frusto-conical front face of the ejector ring which serves as a wedge or inclined plane as the pickup lever moves rearwardly causing the lever to move outwardly. The roller of the pickup lever shown is provided with a beveled edge portion for contacting the face of the ejector ring, the bevel being preferably at the same angle as the face of the ejector ring. When the reel parts are in casting position and the winding drum is rotated to begin retrieving the fishing line, the pickup lever does not move radially outwardly until the release lever is completely tripped and the drum moves rearwardly. This obviates any possibility of the fishing line prematurely engaging the pickup lever and placing unusual tension and wear on the release lever during the tripping operation.

The general object of this invention is to provide an improved spinning reel and an improved line retrieve mechanism of the type referred to above.

Another object of the invention is to provide a spinning reel and pickup mechanism as set forth above wherein the release lever and pickup lever are operable entirely independently of each other.

Still another object of the invention is to provide a spinning reel and pickup mechanism having the above features and characteristics wherein upon rotation of the winding drum to retrieve a cast fishing line, the release lever is completely tripped before the pickup lever is projected outwardly of the winding drum.

Yet another object of the invention is to provide a spinning reel and pickup mechanism of the type referred to wherein the reel parts are placed under minimum tension and receive minimal wear during operation of the pickup mechanism.

A further object of the invention is to provide a line control means as set forth above whereby the line is protected by the drag mechanism at all times during line engagement with the pickup lever.

Other objects and advantages of the invention will be apparent from the following description of one embodiment thereof as disclosed in the accompanying drawings, in which said drawings:

FIG. 3 is a longitudinal section showing the spinning reel in a second operative position;

FIG. 4 is a longitudinal section showing the spinning reel in a third operative position;

FIG. 5 is a cross section taken generally along the line 5—5 of FIG. 4;

FIG. 6 is an enlarged top plan view of the spinning reel pickup mechanism, portions being broken away for clarity;

FIG. 7 is a detail of the pickup mechanism taken generally along the line 7—7 of FIG. 6;

FIG. 8 is a detail of the pickup mechanism taken generally along the same line as FIG. 7 and viewed in the opposite direction as indicated at 8—8; and FIG. 9 is a diametrical cross section of a modified reel spool.

Figure 1:
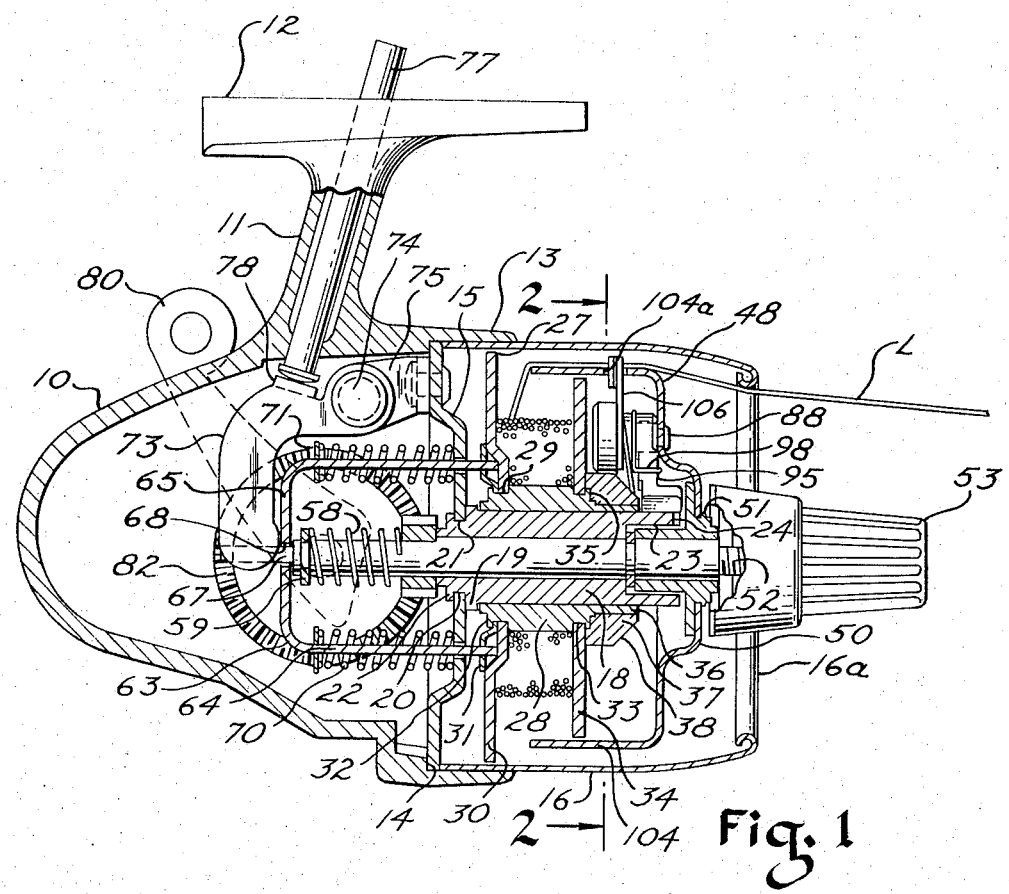
FIG. 1 is a longitudinal section of a preferred form of the spinning reel of this invention.

Referring now to the drawings in all of which like parts are designated by like reference numerals, the embodiment of the spinning reel of this invention as herein disclosed comprises a frame or housing 10 having an outwardly projecting hollow post 11 terminating in a foot 12 suitable for mounting to a fishing rod. The housing 10 has a forwardly projecting, annular flange 13 the inner end of which terminates in an annular step 14 adjacent to which is seated a substantially circular, transverse frame plate 15. A slightly forwardly tapered shroud 16 having a front open end portion 16a is telescoped into the flange 13 with the rearmost edge thereof seated against the frame plate 15. Said shroud is detachably secured in place by any suitable means such as a tongue and bayonet slot means disclosed in applicant's above mentioned U.S. Pat. No. 3,296,731.

A tubular bearing 18 is mounted at one end thereof in the frame plate 15 coaxially with the annular flange 13. The tubular bearing 18 has a radially projecting flange 19 and a diametrically reduced portion 20 adjacent to the rearwardly directed end thereof, said reduced portion 20 projecting through a central aperture 21 in the frame plate 15 and said tubular bearing being securely staked to said frame plate as indicated at 22. The forward end portion of the tubular bearing 18 has a substantial concentric recess 23 therein, and the axially forwardly directed edge of said tubular bearing is cut back in the axial direction at one point to form a circumferentially facing trip 24 in the form of a step with a tapered ramp 25 leading into the trip, as best seen in FIG. 6.

The external surface of the tubular bearing 18 supports an axially slidable spool 27 having a hub 28, the movement of the hub being limited in a rearward direction by the radially projecting flange 19 of said tubular bearing. The hub 28 has a diametrically reduced rear end portion 29 to which are mounted a rear spool flange 30 and a superimposed lock plate 31. Said rear flange and lock plate are suitably centrally apertured to fit over the reduced rear end portion 29 and are securely staked to the hub 28 as indicated at 32. In a similar manner, the forward end of the hub 28 has a reduced forward portion 33 on which a suitably apertured front spool flange 34 is mounted, the same being securely staked as indicated at 35. A still further reduced portion 36 of the hub 28 projects forwardly of the front spool flange 32 and has securely mounted thereto an ejector ring 37 having a beveled, cone-shaped surface 38 at the forward end thereof. Suitable fishing line L is wound upon the spool 27 and is adapted to unwind forwardly in the direction of spool axis through the front open end portion 16a of the shroud 16.

FIG. 9 illustrates a spool 27' comprising integrally formed hub 28', rear flange 30', front flange 34', and ejector ring 37'. A lock plate 31 is disposed over an integral reduced rear end portion 29' and securely staked as indicated at 32'. It will be understood that the spool 27' is in all respects a substitute for the spool 27.

The bore of the tubular bearing 18 supports a rotatable main shaft 40 which is elongated and projects forwardly and rearwardly beyond the ends of said tubular bearing. The main shaft 40 carries a rotatable drum bushing 41 retained against rearward sliding movement on said main shaft by means of a retainer ring 42 disposed in a circumferential groove 43 of said main shaft. The drum bushing 41 as shown in FIG. 1 is adapted to telescope into the forward recess 23 of the tubular bearing 18 and has a radially outwardly projecting, circumferential flange 44 ahead of which is provided a diametrically reduced portion 45. A cup-shaped pickup drum 48 is mounted on the drum bushing 41, said pickup drum having a bottom wall 49 having a central recess portion 50 suitably centrally apertured to fit over the reduced portion 45 where it is securely staked as shown at 51. The main shaft 40 has a forwardly projecting threaded portion 52 upon which is mounted a drag assembly 53 of the type disclosed in applicant's above referred to patents (FIG. 17 of U.S. Pat. No. 3,296,731 and FIG. 22 of U.S. Pat. No. 3,284,091). As thoroughly disclosed in said prior patents, the drag assembly 53 provides retaining means at the front of the drum bushing and is adapted to place an adjustable amount of the drag upon the pickup drum 48 whereby said pickup drum normally rotates with the main shaft 40 but can rotate independently thereof if the pull on the fishing line L exceeds the preadjusted amount.

The main shaft 40 projects rearwardly a substantial distance beyond the tubular bearing 18 and the frame plate 15, such rearwardly extending portion having an elongated, axially parallel flat 56 machined thereon whereby it is adapted to receive a longitudinally slidable but relatively unrotatable pinion 57. Said pinion is spring biased against the rearwardly directed end of the tubular bearing 18 by means of a coil spring 58 disposed between said pinion and a retainer ring 59 disposed in a circumferential groove 60 in the main shaft 40. Thus, said main shaft and the pickup drum 48 are normally biased rearwardly or to the position illustrated in FIG. 1.

The spool 27, ejector ring 37, and pickup drum 48 are movable in a forward direction with respect to the fixed tubular bearing 18 by means comprising a U-shaped push bar 63 having forwardly projecting arms 64 integrally connected by a vertical yoke 65. The arms 64 project forwardly through suitable openings 66 in the frame plate 15, the forward ends thereof engaging the lock plate 31 in any suitable manner whereby the spool 27 is detachably connected to the ends of said arms. The main shaft has a reduced extension 67 which projects rearwardly through an aperture 68 in the yoke 65, said yoke also having a rearwardly projecting flange 69 projecting from one side edge thereof as seen in FIGS. 3 and 4. Compression coil springs 70 surround the arms 64 and are compressed between the frame plate 15 and retainers 71 carried by said arms adjacent to the yoke 65.

A release lever 73 is pivoted about a transverse horizontal axis by pin means 74 carried by a bracket 75 which is secured to the frame plate 15 by a rivet 75a. The release lever 73 has a downwardly projecting arm 76, the lower end of which is disposed adjacent to the rearwardly directed surface of the yoke 65 between the extension 67 and the flange 69. Means for pivoting the release lever 73 in the form of the invention herein shown comprises a push rod 77 which is longitudinally slidable in the hollow post 11 and projects upwardly above the foot 12. The lower end of said push rod bears against a laterally projecting tab 78 of the release lever 73 whereby longitudinal downward movement of said push rod pivots the release lever 73 about the pin 74 to cause the push bar 63 to move forwardly. As said push bar moves forwardly, it also pushes the main shaft 40 forwardly against the tension of the coil spring 58. Actuation of the push rod 77 is preferably effected by an actuator carried by the fishing rod in the manner shown and described in applicant's above mentioned Letters Pat. No. 3,296,731. It will be readily appreciated that the push bar 63 could also be actuated by a thumb actuated control of the type disclosed in applicant's above mentioned U.S. Pat. No. 3,284,019.

Rotation of the pickup drum 48 in the clockwise direction as seen from the front of the reel (FIG. 5) is accomplished in a known manner by means of a crank 80 connected to a crank shaft 81 suitably mounted for rotation in the frame or housing 10 and carrying a face gear 82 which engages and drives the pinion 57 when the crank is turned. The cranking mechanism is preferably provided with an antireverse mechanism which may be of the type shown and described in the above referred to Letters Patent, the same forming no essential part of the present invention.

Figure 2:
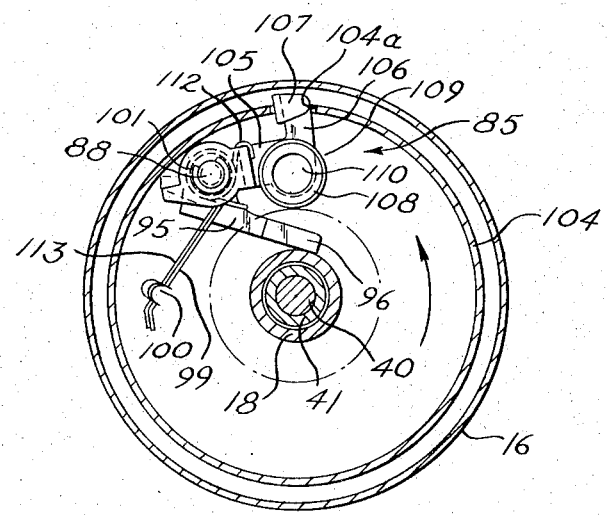
FIG. 2 is a cross section taken generally along the line 2—2 of FIG. 1.

Referring now particularly to FIGS. 2 and 5–8, the immediate actuating means for controlling the fishing line during cast and winding the same upon the spool 27 comprises an assembly generally indicated by the numeral 85 in FIGS. 2, 5 and 6. Said assembly comprises a pickup lever 86 and a trip arm 87 pivotally mounted to the bottom 49 of the pickup drum 48 by means of a stud 88 projecting inwardly or rearwardly with respect to said bottom. The stud 88 has a first journal 89 disposed adjacent to the bottom wall 49, said first journal having a short diametrically reduced portion 90 thereof projecting through a suitable aperture in said bottom wall and swaged or staked to secure the stud in place. Rearwardly of the first journal 89 the stud 88 is substantially enlarged at the portion 91 beyond which said stud is again reduced to afford a second journal 92 having a circumferential groove 93 therein.

The trip arm 87 comprises a bearing 94 pivoted upon the first journal 89 and an elongated laterally offset arm portion 95 widened in a paddlelike configuration at its distal end as indicated at 96. The wide, distal end portion 96 of the trip arm 87 overlies and is biased inwardly toward the drum bushing 41 by a coil spring 97 encircling the enlarged portion 91 and tensioned in a circumferential direction having a first arm 98 engaging the arm portion 95 and a second arm 99 engaged behind an inwardly struck tab 100 of the bottom wall 49.

As herein shown the pickup lever 86 is formed out of flat, heavy gauge sheet metal and has a bearing portion 102 pivoted upon the second journal 92 and retained thereon by a retainer clip 101. The opposite end of said pickup lever 86 comprises a laterally offset extension 105 having an upwardly projecting finger 106 the upper end of which is provided with a folded tab 107 folded about a generally radial axis whereby to present a smooth rounded surface portion 107a for engaging the fishing line. The outer end of the extension 105 at the base of the finger 106 affords journal means for a roller 108 mounted upon a stub shaft 110 having a beveled, rearwardly directed outer peripheral edge indicated at 109. The trip arm 87 is pivotable between two positions; the position shown in FIG. 1 where the outer, wide part 96 of the arm portion 95 is disposed against the outer peripheral surface of the tubular bearing 18, and an inner position illustrated in FIG. 4 wherein said wide portion abuts the outer peripheral surface of the drum bushing 41. The pickup lever is pivotable between an outer position shown in FIG. 1 wherein the roller 108 rides on the outer surface of the ejector ring 37 and an inner position as shown in FIG. 4 wherein the beveled outer edge 109 of said roller abuts the cone-shaped surface 38 adjacent to the forward end of said ejector ring. In the outer position of FIG. 1, the distal end of the finger 106 having the folded tab 107 projects outwardly beyond the outer surface of the flange or wall 104 of the pickup drum 48 through an aperture 104a in said flange whereby the fishing line L from spool 27 passing forwardly over said flange or wall and within the shroud 16 will be caught. In the inner position of FIG. 4, the finger 106 is completely withdrawn inside the pickup drum 48 whereby the line L can spin freely outwardly through the shroud 16. The pickup lever 86 is biased inwardly by a coil spring 111 encircling the enlarged portion 91 of the stud 88 and tensioned in a circumferential direction. A first arm 112 engages the upper edge of the extension 105 and a second arm 113 engages behind the inwardly struck tab 100 in the bottom wall 49.

In describing the operation of the spinning reel of this invention, the reel parts are assumed to be initially in the position of FIG. 1 with the trip arm 87 engaging the outer surface of the tubular bearing 18 and the roller 108 engaging the outer surface of the ejector ring 37 whereby the pickup lever 86 is ejected and the folded portion 107 of the finger 106 is projected outwardly through the aperture 104a in the winding drum flange 104. When the fisherman desires to cast, he actuates the push rod 77 by depressing a suitable member on the fishing rod (disclosed in applicant's aforementioned U.S. Pat. No. 3,296,731) whereby the release lever is pivoted to move the parts to the position shown in FIG. 3. In this position, the main shaft 40 is disposed forwardly whereby the outer end portion 96 of the trip arm 87 drops onto the drum bushing 41 ahead of the fixed tubular bearing 18. Because the ejector ring 37 is also moved forwardly, the roller 108 remains upon the outer surface of said ejector ring and the finger 106 remains in the projected position whereby it engages the fishing line L. With the line thus held against unwinding, the fisherman makes his cast and at the appropriate extended position of his arm, releases the push rod 77 whereby the ejector ring 37 along with the spool 27 moves rearwardly under the bias of the spring 70 to the position shown in FIG. 4, thereby allowing the finger 106 to move inwardly and freeing the line for spinning out through the front of the shroud 16. The main shaft 40 and the pickup drum 48 are prevented from moving rearwardly by the widened end portion 96 of the trip arm 87 now disposed in front of the forward edge of the tubular bearing 18. However, at whatever point the fisherman wishes to terminate his cast, he can again actuate the push rod 77 whereby the spool 27 and ejector ring 37 will move forwardly. This movement will cause a wedging action by said ejector ring against the rim of the roller 108 whereby said roller will move back up to the outer surface of said ejector ring. This causes the finger 106 to be projected whereupon it will snub the line L and terminate the cast.

To rewind the line, the fisherman releases the push rod 77 and begins winding the crank which will rotate the pickup drum 48. The wide portion 96 of the trip arm 87 will move around the drum bushing 41 until it reaches the ramp 25, said ramp allowing the rotating arm to move rearwardly until it overlaps the trip 24 at which point further movement will cause the arm to be tripped outwardly back onto the outer surface of the tubular bearing 18. In this position, the main shaft 40 and the pickup drum move rearwardly under the pressure of the spring 58 to the position shown in FIG. 1, and the pickup lever 86 is moved outwardly by the ejector ring for rewinding the line upon the spool. Whenever the line is in engagement with the finger 106 of the pickup lever, the line is under drag protection by means of the drag assembly 53 which allows the pickup drum 48 to rotate whereever the line is subjected to excessive loads.

Thus it will be seen that the present invention provides simple and effective means for snubbing or releasing the line as well as for winding the line back onto the spool after the cast.

It will be understood that many changes in the details of the invention as herein described and illustrated may be made without, however, departing from the spirit thereof or the scope of the appended claims.

I claim:

1. A spinning reel comprising a frame and support having an axis; a line spool mounted upon said support; said support having an axially facing abutment and a trip; a winding member; means mounting said winding member for manual rotation and axial movement with respect to said support; means resiliently biasing said winding member axially toward an initial position adjacent to said abutment and trip; a trip member; means movably mounting said trip member upon said winding member and means biasing a portion of said trip member inwardly toward the axis of said winding member whereby said trip member moves in front of said abutment, when said winding member is moved axially forwardly away from said abutment, and holds said winding member in the forward position; a line pickup member; means movably mounting said line pickup member upon said winding member for movement between line pickup and line release positions and means biasing said pickup member to a line release position when said winding member is held in a forward position by said trip member only; said means mounting said pickup member affording independent movement thereof with respect to said trip member at all times; an ejector member associated with said support for moving said pickup member to a line pickup position in response to said winding member being moved axially back to said initial position; and said trip member being actuated by said trip upon rotation of said winding member to move out of alignment with said abutment whereby said winding member returns to said initial position and said pickup member is moved to line pickup position independently of said trip member after said trip member is completely tripped.

2. A spinning reel as set forth in claim 1: said ejector member being disposed in transverse alignment with said line pickup member; said line pickup member having a roller disposed on an axis parallel with the axis of said support and contacting a first portion of said ejector member in said initial position of said winding member; and said ejector member having an inclined portion angled inwardly with respect to the axis of said support in a forward direction and projecting forwardly from said first portion whereby said roller slides axially upon said inclined portion between line release and line pickup positions during relative axial movement of said ejector member and winding member.

3. A spinning reel as set forth in claim 1: means mounting said ejector member for movement forwardly with said winding member, and rearwardly independently of said winding member, when said winding member is held in said forward position by said trip member; means biasing said ejector member rearwardly to an initial position; said ejector member being disposed in transverse alignment with said line pickup member and having an annular surface portion; said line pickup member having a roller disposed on an axis parallel with the axis of said support in rolling engagement with said annular surface portion when said winding member and said ejector member are in said initial position; and said ejector member having a forwardly tapered frustoconical portion projecting forwardly from said annular surface portion allowing said pickup member to move inwardly to line release position when said winding member is held in said forward position and said ejector member is allowed to retract.

4. A spinning reel as set forth in claim 3: said roller having a beveled edge portion disposed against said frustoconical portion of said ejector member when said winding member and said ejector member are axially moved relative to each other, the angle of said beveled edge and said frustoconical portion being substantially the same to facilitate sliding movement therebetween.

5. A spinning reel as set forth in claim 1: said ejector member being disposed in transverse alignment with said line pickup member; said line pickup member having a roller disposed on an axis parallel with the axis of said support and contacting a first portion of said ejector member in said initial position; said ejector member having an inclined portion angled inwardly with respect to the axis of said support in a forward direction and projecting forwardly from said first portion, said roller sliding laterally along said inclined portion upon relative movement of said winding member and said ejector member whereby said pickup member is moved inwardly and outwardly between line release and line pickup positions; and means whereby said ejector member is movable forwardly while said winding member is held in the forward position by said trip member whereby to move said pickup member to line pickup position and snub the line.

6. A spinning reel as set forth in claim 1: said line spool comprising a hub mounted upon said support; said hub having front and rear radially projecting spool flanges, and said ejector member being mounted upon said hub; said line pickup member having a roller disposed on an axis parallel with the axis of said support and contacting a first, annular surface portion of said ejector member in said initial position; said ejector member having a forwardly tapering frustoconical portion projecting forwardly of said annular surface portion, said roller being movable inwardly to line release position when said winding member is held in the forward position by said trip member only and said roller is disposed over said frustoconical portion; means whereby said spool and ejector member are movable forwardly on said support from an initial position while said winding member is held in the forward position by said trip member whereby to move said pickup member to line pickup position and snub the line; and means resiliently biasing said spool and ejector rearwardly to said initial position thereof.

7. A spinning reel as set forth in claim 1: said winding member comprising a wall portion disposed transversely with respect to the axis of said winding member; journal means projecting rearwardly from said wall portion; said trip member journalled at one end thereof on said journal means; said trip member having a distal end portion overlapping said support, said distal end portion being substantially widened in the direction parallel with the axis of said support whereby to hold said winding member a substantial distance in the forward direction; and said means biasing said trip member comprising spring means pivotally biasing said trip member whereby said widened distal end portion is urged inwardly toward the axis of said support.

8. A spinning reel as set forth in claim 1: said winding member being generally cup shaped and comprising a wall portion disposed transversely with respect to the axis of said winding member and a rearwardly projecting, circumferentially continuous, coaxial flange having an opening therein; journal means projecting rearwardly of said wall portion; said trip member journaled at one end thereof on said journal means and having a distal end portion overlapping said support; spring means pivotally biasing said trip member whereby said distal end portion is urged inwardly toward the axis of said support; said pickup member journaled at one end thereof on said journal means; a roller mounted on a distal end portion of said pickup member, said distal end portion having an angled finger portion adapted to be projected through said opening in said flange; said ejector member being disposed in transverse alignment with said line pickup member; said roller disposed on an axis parallel with the axis of said support and contacting a first portion of said ejector member in said initial position of said winding member whereby said finger portion projects outwardly of said flange in line pickup position; said ejector member having an inclined portion angled inwardly with respect to the axis of said support in a forward direction whereby said roller moves inwardly and said finger portion retracts inside said flange when said winding member is held in the forward position by said trip member only.

9. A spinning reel as set forth in claim 8: said first portion of said ejector member comprising an annular portion of largest diameter; said inclined portion comprising a forwardly tapering frustoconical portion; means manually axially slidably mounting said ejector member on said support whereby said ejector member is movable forwardly to project said finger portion outwardly of said flange for snubbing the line when said winding member is held in the forward position; and means resiliently biasing said ejector member toward an initial rearward position.

10. A spinning reel as set forth in claim 9: means mounting said ejector member unitarily with said line spool for axial sliding movement therewith on said support.

11. A spinning reel as set forth in claim 9: said roller having a beveled edge portion disposed against said frustoconical portion of said ejector member during relative movement between said ejector member and said winding member, the angle of said beveled edge and said frustoconical portion being substantially the same to facilitate movement therebetween.

12. A spinning reel comprising a frame; a support mounted to said frame; a line spool mounted upon said support, said support having means providing an axially facing abutment and a trip; a winding member; means rotatably and axially slidably mounting said winding member with respect to said support; means for rotating said winding member; means for axially shifting said winding member forwardly away from said abutment and trip; means resiliently urging said winding member rearwardly toward said abutment and trip; a trip member; means pivotally mounting said trip member upon said winding member; means biasing a portion of said trip member inwardly toward said support; a line pickup member; means pivotally mounting said line pickup member upon said winding member for movement independently of said trip member; ejector means; means mounting said ejector means for axial movement with respect to said support whereby said ejector means is movable forwardly with said winding member and rearwardly independently of said winding member; means resiliently urging said ejector means rearwardly; said trip member responsive to positioning of said winding member away from said abutment and trip to drop in front of said abutment and hold said winding member in such position when said ejector member is retracted, whereby said pickup member is in line release position for casting; said trip member being tripped outwardly of said abutment by said trip upon rotation of said winding member whereby said winding member returns toward said abutment and trip; said ejector means having means moving said pickup member outwardly to line pickup position as said pickup member moves axially rearwardly with said winding member.

13. In a spinning reel having a fixed bearing, a line spool mounted upon said bearing, a winding member disposed in front of the bearing, means mounting said winding member to said bearing for axial movement, means biasing said winding member rearwardly, a trip on the front of the bearing, an ejector member, means mounting said ejector member whereby said ejector member is movable forwardly with said winding member and rearwardly independently thereof; a trip arm and a line pickup lever; means pivotally mounting said trip arm and pickup lever to said winding member for free pivotal movement with respect to each other at all times; spring means urging said trip arm and line pickup lever inwardly, said line pickup lever contacting said ejector member and disposed in a line pickup position when said winding member and ejector member are both in a rearward position and when they are both in a forward position; said trip arm adapted to drop in front of said bearing and maintain said winding member forwardly whereby rearward axial movement of said ejector member causes said pickup lever to retract to a line release position; and means for rotating said winding member whereby said trip arm is moved outwardly by said trip, after which said winding member moves rearwardly and said pickup lever is again ejected by axial movement with respect to said ejector member.

14. In a spinning reel as set forth in claim 12: means mounting said ejector member unitarily with said line spool for axial sliding movement therewith on said bearing.

* * * * *